United States Patent [19]

Holthuis

[11] 4,024,062
[45] May 17, 1977

[54] STRAINER DEVICE

[75] Inventor: Herman Holthuis, Veendam, Netherlands

[73] Assignee: Nivoba B.V., Veendam, Netherlands

[22] Filed: July 24, 1973

[21] Appl. No.: 382,199

[30] Foreign Application Priority Data
July 24, 1972 Netherlands .................... 7210202

[52] U.S. Cl. ................................. 210/219; 210/415
[51] Int. Cl.² ........................................ B01D 29/42
[58] Field of Search .......... 210/219, 405, 413–415, 210/416, 304; 209/273, 306

[56] References Cited
UNITED STATES PATENTS

| | | | |
|---|---|---|---|
| 776,084 | 11/1904 | Prichard ............................ | 210/219 |
| 810,250 | 1/1906 | Barth ............................. | 210/219 X |
| 1,382,056 | 6/1921 | Bontemps et al. ............. | 210/414 X |
| 1,624,831 | 4/1927 | Geddes .......................... | 210/219 X |
| 1,993,214 | 3/1935 | Hass ............................... | 210/415 X |
| 2,181,404 | 11/1939 | Koppitz et al. ................ | 210/219 X |
| 3,356,218 | 12/1967 | Grudoski ........................ | 210/416 X |
| 3,508,651 | 4/1970 | Hooper .......................... | 210/219 X |
| 3,739,915 | 6/1973 | Kehoe et al. .................. | 210/415 X |

*Primary Examiner*—Thomas G. Wyse
*Assistant Examiner*—Robert H. Spitzer
*Attorney, Agent, or Firm*—Snyder, Brown & Ramik

[57] ABSTRACT

A device for straining substances suspended in liquid having a hollow straining member in the form of a stationary body of revolution having a diameter continuously decreasing on the feed side, wherein inside the straining member a rotatable body of rotation is disposed whose outer wall is spaced at a short distance from the inner wall of the straining member in order to achieve that the layer of material to be strained is clogged at overloaded places on the strainer.

15 Claims, 4 Drawing Figures

FIG.1

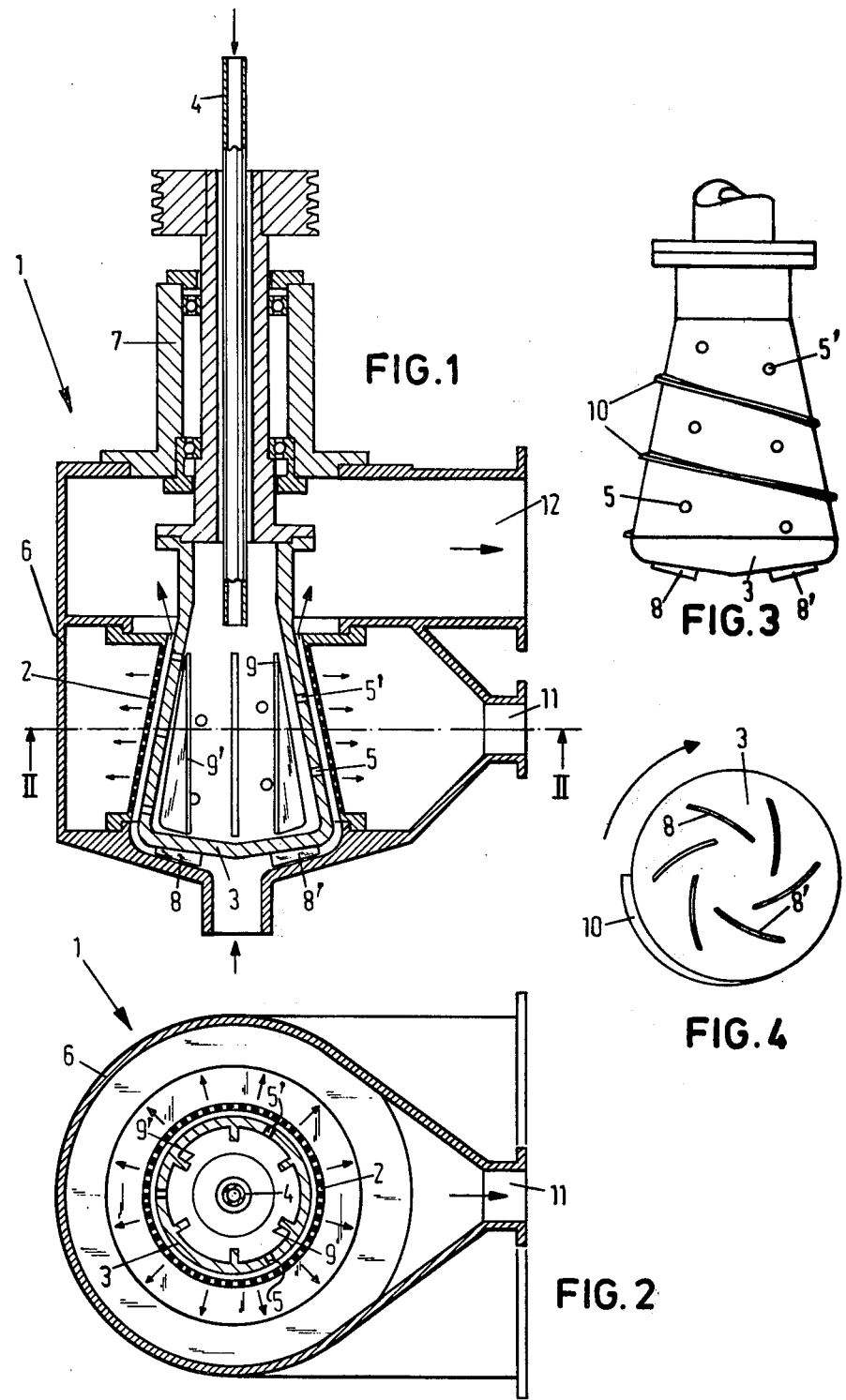

STRAINER DEVICE

The invention relates to a device for straining substances suspended in liquid, which has a hollow straining member in the form of a stationary body of revolution having a diameter continuously decreasing on the feed side. In strainer devices of the kind specified the material to be strained is fed in a thin layer to the straining member. Sometimes the material to be strained is given a radial component of velocity, so that it moves over the straining member along a spiral path. The straining effect is then boosted by centrifugal forces exerted on the material. The disadvantage of this and other kinds of strainer devices is the difficulty of keeping constant the thickness of the layer of material to be strained on the straining member, which may therefore be overloaded at some places and underloaded at others. As a result the strainer may become clogged at the overloaded places. Another factor is that during its conveyance along the straining wall some of the material is strained off, and the total amount of material thus becomes progressively smaller.

To obviate these disadvantages, according to the invention, there is disposed inside the straining member a rotatable body of rotation whose outer wall is disposed at a short distance from the inner wall of the straining member. The material to be strained is fed to the slot between the straining wall and the body of rotation and forced by the rotation thereof under the influence of centrifugal forces against the straining wall. The diameter of the straining member follows a course such that the layer of the material to be strained is constant over the straining member.

One advantage of rotating the material by the body of rotation, instead of using a rotating straining member, is that the straining member is not subjected to centrifugal forces resulting from its own mass and can therefore be constructed in a lighter manner with finer meshes.

The wall of the body of rotation can be formed with apertures for the feed of detergent supplied via a hollow driveshaft of the body of rotation. The detergent can be rotated by blades inside the body of rotation which also form a pump for conveying the detergent.

Blades disposed on the side of the body of rotation adjacent the feed apertures of the device can feed material to the gap between the straining wall and the body of rotation and distribute the material uniformly. The conventional pump for feeding the material to the device can be eliminated, since its function is performed by the blades on the head side of the body of rotation. The time spent by the material along the straining wall can be controlled inter alia by means of guide blades disposed on the straining member of the body of rotation.

An embodiment of the invention will now be described in greater detail with reference to the drawings, wherein:

FIG. 1 is a longitudinal section through a strainer device according to the invention, FIG. 2 is a cross-section, taken along the line II—II in FIG. 1, FIG. 3 is a front elevation of the body of rotation, and FIG. 4 is a bottom plan view of the body of rotation as shown in FIG. 3.

The strainer device 1 comprises a strainer in the form of a hollow body of revolution 2 containing a body of rotation 3 which is driven by a hollow shaft 4 and whose wall is formed with apertures 5, 5' . . . The straining member 2 is received in a casing 6. The body of rotation 3 is mounted on one side in a member 7 connected to the casing 6. The drive of the shaft 4 is not shown. Blades 8, 8' . . . are disposed on the head side of the body of rotation 3. Disposed in the body of rotation are blades 9, 9' . . . which rotate the detergent and convey it outside through apertures 5, 5' . . . Disposed on the body of rotation 3 are guide blades 10 which play a part in controlling the time spent by the material along the straining wall.

The material to be strained is fed to the device, on the left-hand side as shown in the drawing, and uniformly conveyed by the blades 8, 8' . . . to the gap between the straining member 2 and the body of rotation 3. The centrifugal forces produced by the rotation of the body 3 force the material against the straining wall. Some of the material passes cut, in the direction indicated by the arrows, through the meshes in the straining wall and is removed via aperture 11. The remaining part of the material emerges at the place of minimum diameter from the gap between the straining body 2 and the body of rotation 3 and is removed via aperture 12. The detergent is fed, in the direction indicated by the arrow, to the hollow shaft 4 and is rotated by the blades 9, 9' . . . and forced outwards through the apertures 5, 5' . . . by centrifugal forces.

The gap between the body of rotation 3 and the straining member 2 is adapted to the required thickness of the layer of material to be screened. A strainer device of this kind is more particularly suitable for the straining of suspensions, such as flour from potato pulp, crystals from liquids, and the like.

What is claimed is:

1. A device for straining substances suspended in liquid, comprising in combination:

a housing having a partition defining first and second liquid discharge chambers, said housing having a wall spaced from said partition and said wall having an inlet opening for liquid plug suspended material leading directly to said first chamber;

a hollow, tapered, stationary straining member bridging between said wall and said partition, the taper of said member providing a larger end and a smaller end therefor and said member having its larger end surrounding said inlet opening and said member extending to said partition whereby to constrain liquid plus some of the suspended material entering through said inlet to pass through said straining member before reaching said first chamber, said partition having an opening aligned with said inlet opening in said wall and surrounded by the smaller end of said straining member whereby to communicate said inlet opening directly with said second chamber;

a body rotatably mounted with respect to said housing about an axis concentric with said straining member, said body having a portion within said straining member which is tapered similarly to said straining member and having a further portion projecting through said opening in said partition thereby to restrict direct communication between said inlet opening and said second chamber to a narrow annular passage defined by the space between said straining member and said body whereby liquid plus suspended material which cannot pass said straining member discharges continuously into said second chamber only through the narrow annular region at said smaller end of the straining member where said further portion projects through said opening in said partition; and means for rotating said body to force the liquid and suspended material outwardly against said straining member.

2. A device as defined in claim 1 wherein said inlet opening is concentric with said axis of rotation and is substantially smaller than the larger end of said body, and a plurality of radially extending blades on the exterior surface of said larger end of the body defining a centrifugal pump for inducting liquid plus suspended material through said inlet opening for discharge to said annular passage at the larger ends of said straining member and body.

3. A device as defined in claim 2 wherein said body is hollow and includes openings in its wall facing said straining member, and means for discharging supplemental liquid into the interior of said body to flow outwardly through the openings therein.

4. A device as defined in claim 3 wherein said straining member is of frusto-conical form and is tapered to ensure a constant thickness of suspended material along its length.

5. A device as defined in claim 4 wherein said body is provided with a spiral blade on the exterior surface thereof facing said straining member to control the residence time of liquid through said annular passage.

6. A device as defined in claim 2 wherein said body is hollow and includes openings in its wall facing said straining member, and means for discharging supplemental liquid into the interior of said body to flow outwardly through the openings therein, the interior surface of said body being provided with longitudinally extending blades to force supplemental liquid through the openings in said body.

7. A device as defined in claim 2 wherein said straining member is of frusto-conical form and is tapered to ensure a constant thickness of suspended material along its length.

8. A device as defined in claim 7 wherein said body is provided with a spiral blade on the exterior surface thereof facing said straining member to control the residence time of liquid through said annular passage.

9. A device as defined in claim 8 wherein said body is hollow and includes openings in its wall facing said straining member, and means for discharging supplemental liquid into the interior of said body to flow outwardly through the openings therein, the interior surface of said body being provided with longitudinally extending blades to force supplemental liquid through the openings in said body.

10. A device as defined in claim 7 wherein said body is hollow and includes openings in its wall facing said straining member, and means for discharging supplemental liquid into the interior of said body to flow outwardly through the openings therein, the interior surface of said body being provided with longitudinally extending blades to force supplemental liquid through the openings in said body.

11. A device as defined in claim 1 wherein said straining member is of frusto-conical form and is tapered to ensure a constant thickness of suspended material along its length.

12. A device as defined in claim 11 wherein said body is provided with a spiral blade on the exterior surface thereof facing said straining member to control the residence time of liquid through said annular passage.

13. A device as defined in claim 12 wherein said body is hollow and includes openings in its wall facing said straining member, and means for discharging supplemental liquid into the interior of said body to flow outwardly through the openings therein, the interior surface of said body being provided with longitudinally extending blades to force supplemental liquid through the openings in said body.

14. A device as defined in claim 11 wherein said body is hollow and includes openings in its wall facing said straining member, and means for discharging supplemental liquid into the interior of said body to flow outwardly through the openings therein, the interior surface of said body being provided with longitudinally extending blades to force supplemental liquid through the openings in said body.

15. A device as defined in claim 1 wherein said body is hollow and includes openings in its wall facing and straining member, and means for discharging supplemental liquid into the interior of said body to flow outwardly through the openings therein, the interior surface of said body being provided with longitudinally extending blades to force supplemental liquid through the openings in said body.

* * * * *